United States Patent
Sung et al.

(10) Patent No.: US 7,500,899 B2
(45) Date of Patent: Mar. 10, 2009

(54) ARTIFICIAL MARBLE USING MULTICOLOR CHIP AND METHOD FOR PREPARING THE SAME

(75) Inventors: Min-Chul Sung, Cheongju (KR); Bong-Hyun Kwon, Cheongju (KR); Jae-Ho Oh, Cheongju (KR); Won-Gu Choi, Cheongju (KR); Jong-Cheol Lee, Cheongju (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 11/263,294

(22) Filed: Oct. 31, 2005

(65) Prior Publication Data

US 2006/0217033 A1    Sep. 28, 2006

(30) Foreign Application Priority Data

Mar. 25, 2005 (KR) .................. 10-2005-0024729
Apr. 11, 2005 (KR) .................. 10-2005-0029786

(51) Int. Cl.
*A63H 33/22* (2006.01)
*A63H 33/00* (2006.01)

(52) U.S. Cl. .................. 446/219; 446/392
(58) Field of Classification Search ......... 446/389–393, 446/168, 219
See application file for complete search history.

(56) References Cited

U.S. PATENT DOCUMENTS 5,567,745 A * 10/1996 Minghetti et al. ........... 523/202

FOREIGN PATENT DOCUMENTS

| JP | 05-068611 | | 9/1993 |
| JP | 09095541 A | * | 4/1997 |
| KR | 2001084598 A | * | 9/2001 |
| KR | 2003000496 A | * | 1/2003 |
| KR | 2003067600 A | * | 8/2003 |
| KR | 2003-86889 | | 11/2003 |
| KR | 2003086178 A | * | 11/2003 |
| KR | 10-2004-0059913 | * | 7/2004 |
| KR | 2004059913 A | * | 7/2004 |

* cited by examiner

*Primary Examiner*—Kien T Nguyen
(74) *Attorney, Agent, or Firm*—Cantor Colburn LLP

(57) ABSTRACT

Disclosed herein are an artificial marble using multicolor chips, particularly striped chips, and a method for preparing the artificial marble. Since the artificial marble comprises multicolor chips in a new form together with conventional single-color chips, it enables achievement of various appearances, including designs and colors, thereby being highly differentiated from conventional artificial marbles containing combinations of single-color chips as well as displaying patterns and designs closely resembling natural granite.

12 Claims, 6 Drawing Sheets

(a)

(b)

(a)

(b)

(a)

(b)

(a)                    (b)

ARTIFICIAL MARBLE USING MULTICOLOR CHIP AND METHOD FOR PREPARING THE SAME

This application claims the benefit of the filing dates of Korean Patent Application No. 10-2005-0024729 filed on Mar. 25, 2005 and Korean Patent Application No. 10-2005-0029786 filed on Apr. 11, 2005 in the Korean Intellectual Property Office, the disclosures of which are incorporated herein in their entirety by reference.

TECHNICAL FIELD

The present invention relates to an artificial marble using multicolor chips and a method for preparing the artificial marble. More specifically, the present invention relates to an artificial marble prepared by applying multicolor chips containing pigments of various colors in each chip as colorant chips to preparation of an acrylic or unsaturated polyester artificial marble, thereby being highly differentiated from conventional artificial marbles containing combinations of single-color chips as well as displaying patterns and designs closely resembling natural granite, and a method for preparing the artificial marble.

Particularly, the present invention relates to an artificial marble using striped chips of various colors in which an acrylic or unsaturated polyester resin is used as a base resin, and a method for preparing the artificial marble. More specifically, the present invention relates to an artificial marble prepared by adding new design chips (striped chips of various colors) to chips used in conventional acrylic or unsaturated polyester artificial marbles, thereby allowing the final artificial marble to have diverse designs and be highly three-dimensional, and a method for preparing the artificial marble.

BACKGROUND ART

Artificial marbles refer collectively to artificial synthetic products prepared by blending natural stone powder and minerals with a resin component (acrylic, unsaturated polyester, epoxy, etc.) or cement and adding various kinds of pigments and additives to the blend so as to realize a natural stone-like texture. Representative artificial marbles include acrylic artificial marbles, unsaturated polyester artificial marbles, and the like.

Acrylic artificial marbles and unsaturated polyester artificial marbles have strength and color tones peculiar to solid materials. Particularly, acrylic artificial marbles show good workability and superior weather resistance. Acrylic artificial marbles are lightweight and nonporous, compared to natural marbles. In addition, acrylic artificial marbles have an elegant color tone, high strength and excellent weather resistance like natural marbles. Furthermore, acrylic artificial marbles show superior workability comparable to wood. Based on these advantages, acrylic artificial marbles can be distinguished from natural marbles.

On the other hand, unsaturated polyester artificial marbles are disadvantageous in terms of poor weather resistance and heat resistance and difficult thermoforming over acrylic artificial marbles. However, since unsaturated polyester artificial marbles have a refractive index similar to that of aluminum hydroxide used as filler, the polymerized products are highly transparent, thus advantageously achieving a natural and deep appearance like natural stone.

In recent years, artificial marbles have been used in various applications, such as top boards, dressing tables, wash stands, tables, wall materials, flooring materials, furniture, interior decorative materials, indirect lighting panels, interior goods, etc.

In general, acrylic artificial marbles have the advantages of graceful appearance and excellent workability, as well as are advantageous in terms of light weight and high strength over natural marbles. Based on these advantages, acrylic artificial marbles are widely used as materials for counter tables and interior decorative goods. However, acrylic artificial marbles have technical limitations in expressing various patterns utilizing simple combinations of single-color chips commonly known in the art, when compared to natural marbles and granite.

Acrylic artificial marbles are commonly prepared by mixing a filler, e.g., aluminum hydroxide, calcium carbonate and silica, a pigment and a curing agent with a syrup of a monomer, e.g., methyl methacrylate, and polymethyl methacrylate, molding the mixture in a mold or a continuous steel belt, and curing the molded mixture.

Pigments and chips are mainly used to provide colors and shapes to artificial marbles. These chips and artificial marbles share the use of main components in common. Single-color pigments are added during preparation of artificial marbles and crushed to allow the final artificial marbles to have various colors and particle sizes.

Conventional chips are predominantly single-color chips in the form of a fine powder or having a size of 2.5 mesh or less. Although various kinds of chips are used depending on the desired colors and the size of the chips is varied, patterns similar to natural marbles are not easily attained. That is, there is a limitation in expressing natural textures due to a difference in the color between base resins of artificial marbles and single-color chips.

According to conventional methods for the preparation of artificial marbles having various colors, various kinds of single-color chips are produced, and mixed with base raw materials so as to display designs of natural granite. However, the designs of the artificial marbles thus prepared are monotonous and unnatural unlike the designs of natural granite. Therefore, conventional combinations of single-color chips have technical limitations in practically realizing patterns inherent to natural stone.

DISCLOSURE

Technical Problem

The present inventors have produced multicolor chips of two or more colors in each chip, particularly striped chips of two or more colors, by using resin pigment compositions consisting essentially of an acrylic resin or an unsaturated polyester resin, a filler, and various pigments. In addition, the present inventors have prepared artificial marbles having designs and patterns close to those of natural stone by using the multicolor chips in the preparation of the artificial marbles, compared to conventional artificial marbles using single-color chips, thus accomplishing the present invention.

Therefore, it is one object of the present invention to provide multicolor chips for artificial marbles capable of displaying two or more colors in each chip due to the presence of pigments of different colors wherein the multicolor chips are produced by mixing resin pigment compositions of two or more colors to make an original plate and crushing the original plate to a predetermined size.

It is another object of the present invention to provide a method for preparing the multicolor chips.

It is another object of the present invention to provide an artificial marble which is highly distinguished from conventional artificial marbles using various kinds of single-color chips and has designs and colors close to those of natural stone wherein the artificial marble is prepared by applying the multicolor chips composed of two or more resin pigment compositions to the preparation of the artificial marble.

It is yet another object of the present invention to provide a method for preparing the artificial marble.

It is a particular object of the present invention to provide an artificial marble having a natural stone-like texture prepared using striped chips in a new shape together with chips used in conventional artificial marbles, and a method for preparing the artificial marble.

Technical Solution

In accordance with one aspect of the present invention for achieving the above objects, there is provided an artificial marble comprising multicolor chips in which two or more color regions are present in each chip and the respective color regions are defined by a boundary formed due to a color difference between adjacent color regions.

In the present invention, the color difference ($\Delta E$) is preferably 0.01 or higher, as measured using the CIE color system developed by the Commission Internationale de l'Eclairage (CIE), so that colors of the respective color regions can be readily discerned. When $\Delta E$ is lower than 0.01, the adjacent color regions are regarded as having the same color. Meanwhile, when $\Delta E$ is higher than 0.01, the adjacent color regions are regarded as having different colors from each other.

According to a preferred embodiment of the present invention, the multicolor chips have a striped pattern.

The striped chips used herein include one or more stripe regions extended continuously or discontinuously along the circumference of the chips.

The term "continuously extended" refers to a state wherein the stripe regions are extended without being cut, and the term "discontinuously extended" refers to a state wherein the stripe regions are intermittently cut but uncut parts are continuous.

The stripe regions are in the form of a regular or irregular straight or curved line, and substantially show a pattern close to a regular straight line.

According to one embodiment of the present invention, the striped chips include one background region and one or more stripe regions.

According to another embodiment of the present invention, the striped chips consist of two or more stripe regions.

The term "background region" as used herein refers to a color region occupying a major portion of the chips. As the thickness of the stripe regions in the chips increases, the background region disappears and thus the stripe regions directly form a boundary.

The striped chips are divided into the background region and the stripe regions for convenience. For example, if a plurality of thin stripe region are formed in one background color, the background region is clearly discernable. However, if the intervals between the stripe regions are narrow, the width of the stripe regions is large, or the stripe regions are adjacent to each other, the background region may be regarded as being included in the stripe regions.

In the present invention, one of the stripe regions may be wholly or partly adjacent to another stripe region along the circumference of the chips. Alternatively, one stripe region may be wholly spaced apart from another stripe region along the circumference of the chips. For example, at least two stripe regions present in the background region are parallel to each other or do not cross each other in each chip. Alternatively, two stripe regions may overlap or cross each other in each chip.

In this manner, various striped patterns can be achieved in the artificial marble of the present invention.

It is desirable that the stripe regions have a width of between 0.1 mm and 10 mm. For example, the stripe regions may be thinly formed in the background region. Also, only stripe regions having a large width may constitute the chips without any background region because they are not discernable from the background region. If the width of the stripe regions is too small, striping effects cannot be anticipated. Meanwhile, if the width of the stripe regions is too large, only colors of the stripe regions having a relatively large width are expressed and the stripes disappear in the chips obtained after the subsequent crushing.

It is preferred that the size of the multicolor chips used in the present invention be between 0.1 mm and 10 mm. When the multicolor chips have a size larger than 10 mm, they undergo difficulties in use. The reason for the limited size is because the multicolor chips are commonly made into a flat plate having a thickness of about 14 mm. Thus, there are dangers of cracks between the chips and a base and of being caught in an impeller of a batch mixer. Further, the multicolor chips having a size larger than 10 mm may adversely affect the flowability of raw materials. Accordingly, the size of the multicolor chips is limited to 10 mm or less. Within the thickness of 10 mm or less, although relatively smaller chips are advantageous in use over relatively larger chips, it is preferred to use larger chips in terms of manifestation of designs in the final product. Accordingly, it is preferred that the multicolor chips be crushed to various sizes and mixed to prepare an artificial marble. For example, the chips are crushed to 2.5~3.5 mesh, 3.5~6 mesh, 6~10 mesh, 10~16 mesh, 16~30 mesh, 30~40 mesh, and 40~100 mesh, and mixed together before molding into an artificial marble.

The multicolor chips used in the present invention are produced by adding pigments to artificial marble raw materials consisting of a base resin syrup, an inorganic filler, a crosslinking agent and a polymerization initiator to prepare two or more kinds of slurries having different colors, feeding the slurries to a batch mixer, partially dispersing the slurries in the batch mixer, molding the dispersed slurry mixture into a flat plate, curing the flat plate, and crushing the cured plate. Hence, the multicolor chips thus produced can display two or more colors in each chip.

The colors of the multicolor chips can be created using an organic or inorganic pigment, a dye, or single-color chips having a size of 30 mesh (0.535 mm) or less.

In addition to the multicolor chips, such as striped chips, the artificial marble of the present invention may further comprise single-color chips, enabling achievement of various appearances.

In accordance with another aspect of the present invention, there is provided a method for preparing the artificial marble comprising the steps of producing multicolor chips from two or more kinds of artificial marble raw material compositions having different colors and applying the multicolor chips to artificial marble raw materials.

Specifically, the method comprises the steps of (a) adding pigments to artificial marble raw materials to prepare two or more kinds of slurries, (b) feeding the two or more kinds of slurries into a batch mixer and partially dispersing the slurries in the batch mixer, (c) making the partially dispersed slurry mixture into a flat plate, (d) curing the flat plate and crushing the cured plate into multicolor chips, and (e) applying the multicolor chips to a slurry of artificial marble raw materials.

The slurries have a viscosity of 300~70,000 cps, and preferably 500~30,000 cps. When the viscosity of the slurries is too high, natural spreading and diffusion of designs are impossible and the workability is deteriorated. On the other hand, when the viscosity is too low, designs are completely mixed. Accordingly, the viscosity of the slurries is preferably limited to the defined range.

In step (b) of dispersing the slurries, the slurries are fed into a batch mixer through respective supply lines, and then partially dispersed by mixing using an impeller at a speed of 60 rpm or lower. This partial dispersion may allow spreading or formation of a boundary between different colors in the slurry mixture.

In step (c) of making a flat plate, it is preferred that the partially dispersed slurry mixture be continuously supplied to a continuous conveying steel belt to mold it into a flat plate, followed by curing. Alternatively, the slurry mixture is poured into a mold, followed by curing in a hot-air oven.

DESCRIPTION OF DRAWINGS

The above and other objects, features and other advantages of the present invention will be more clearly understood from the following detailed description taken in conjunction with the accompanying drawings, in which.

BEST MODE

Hereinafter, the present invention will be explained in detail with reference to the accompanying drawings.

Figure 1:
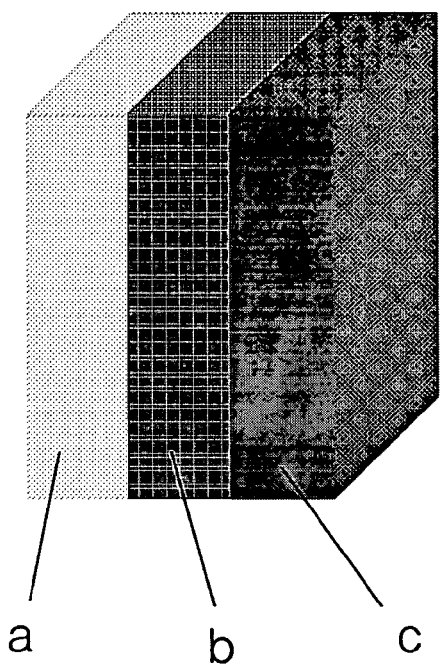
FIGS. 1a and 1b are perspective views of striped chips according to one embodiment of the present invention.
Figure 1:
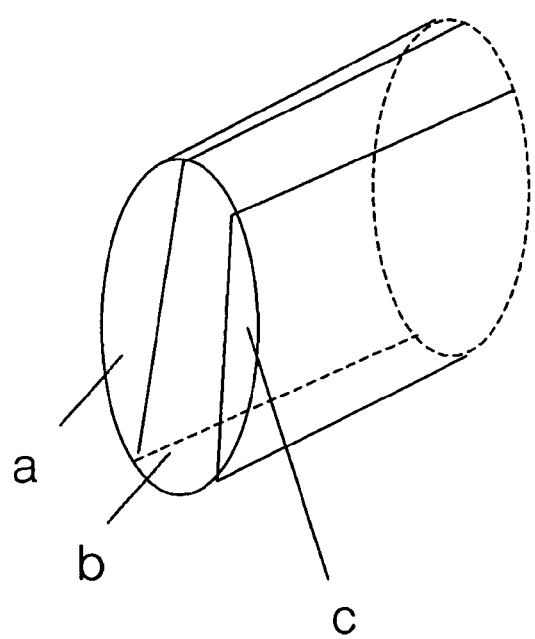

FIGS. 1a and 1b show the shape of striped chips according to one embodiment of the present invention. As shown in FIGS. 1a and 1b, the striped chips have two or more colors and a stripe shape. The striped chips shown in FIGS. 1a and 1b consist of three stripe regions a, b and c of different colors without any background region. The stripe regions of the striped chip shown in FIG. 1a have the same width and are extended parallel to one another. Alternatively, the stripe regions of the striped chip shown in FIG. 1b have different width and are not parallel to one another.

The regions a, b and c have different colors whose ΔE is 0.01 or higher, as measured using the CIE color system. The color system that was first developed by the Commission Internationale de l'Eclairage (or International Commission on Illumination, CIE) in 1931 is a system for quantifying colors and expressing the results as numerical values. According to the CIE color system, information regarding a light source and an observer is standardized, and then colors observed by the standardized observer from the standardized light source are expressed as numerical values.

The present invention employs the standard color-difference formula CIE L*a*b recommended by the CIE in 1976, represented by Equation 1 below:

$$\Delta E^*ab=[(\Delta L^*)^2+(\Delta a^*)^2+(\Delta b^*)^2]^{1/2} \quad \text{Equation 1}$$

wherein ΔE represents a color difference; and ΔL*, Δa* and Δb* represent a difference in the lightness between two samples according to the CIE Lab formula.

ΔE can be measured using a color measuring system, such as a tristimulus calorimeter, a spectroradiometer, or a spectrophotometer.

Figure 2:
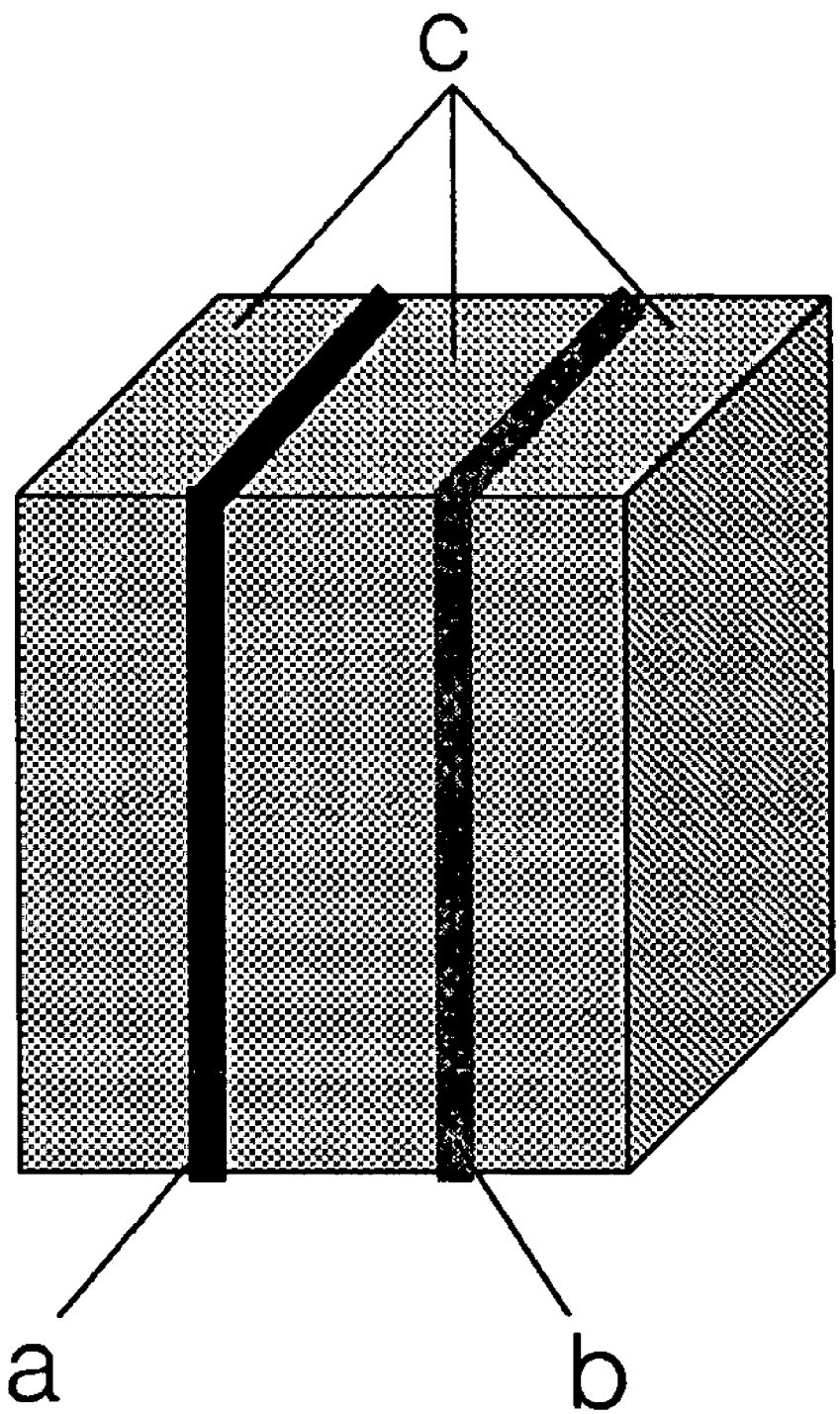
FIG. 2 is a perspective view of a striped chip according to another embodiment of the present invention.

FIG. 2 is a perspective view of a striped chip according to another embodiment of the present invention. Stripe regions of the striped chip may have a similar width, as in the striped chip shown FIG. 1a, but are thinly formed in a background region. The regions a, b and c have different colors. The region c is a background region, and the regions a and b having a relatively small width are stripe regions.

Figure 3:
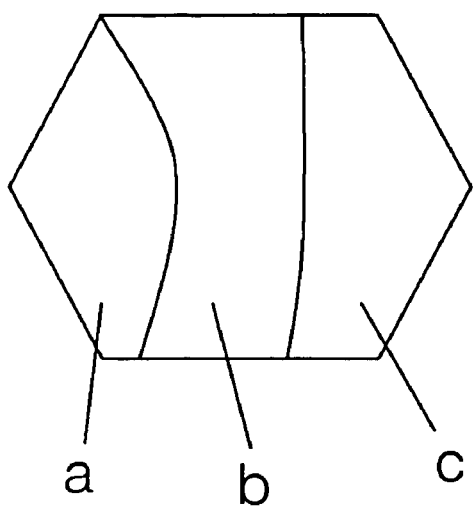
FIGS. 3a and 3b are cross-sectional views of artificial marbles with continuous stripes prepared by application of striped chips according to the present invention.
Figure 3:
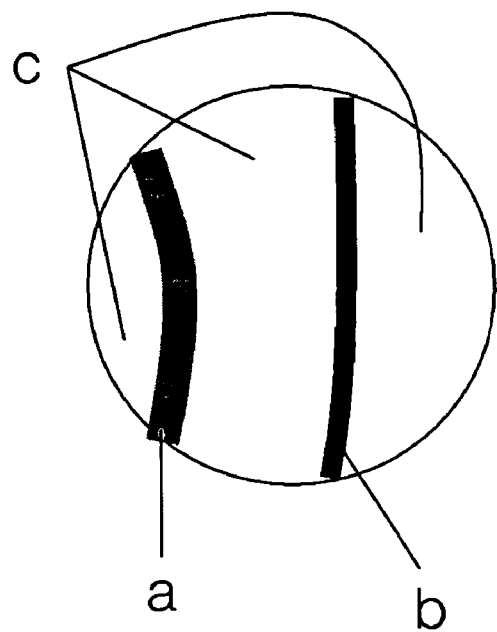
Figure 4:
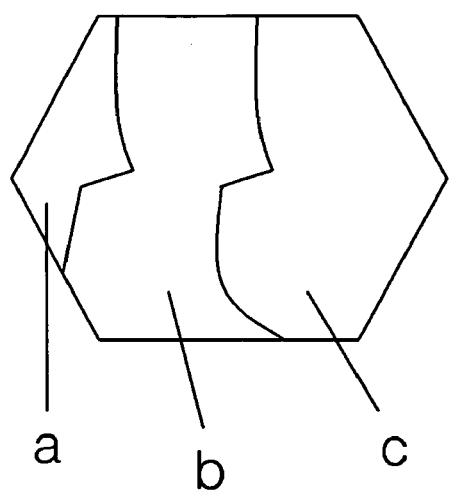
FIGS. 4a and 4b are cross-sectional views of artificial marbles with discontinuous stripes prepared by application of striped chips according to the present invention.
Figure 4:
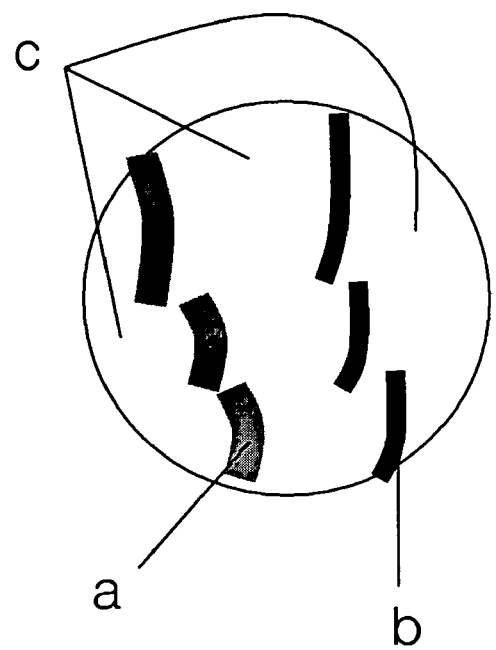

When the striped chip is used to prepare an artificial marble, the cross section of the striped chip is exposed to the surface of the artificial marble. The stripes of the striped chip may be a continuous straight or curved line as shown in FIGS. 3a and 3b, or may be cut or may not be a straight line as shown in FIGS. 4a and 4b.

Figure 5:
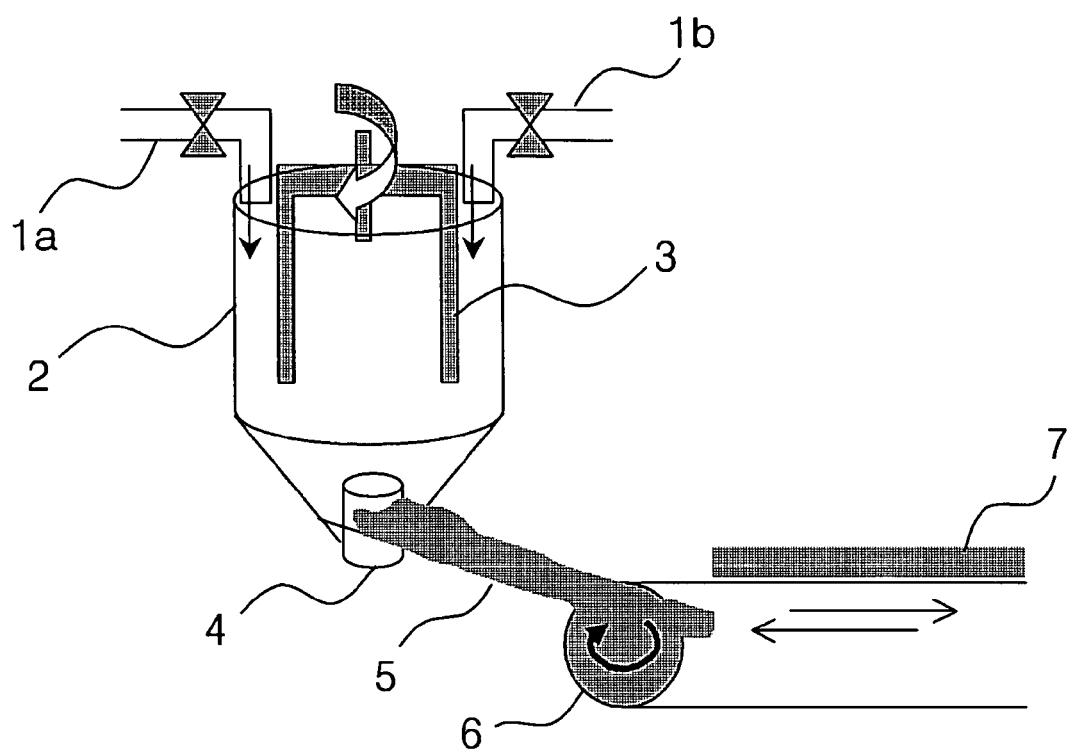
FIG. 5 is a diagrammatic representation showing a process for making multicolor chips into a flat plate in accordance with the present invention.
Figure 6:
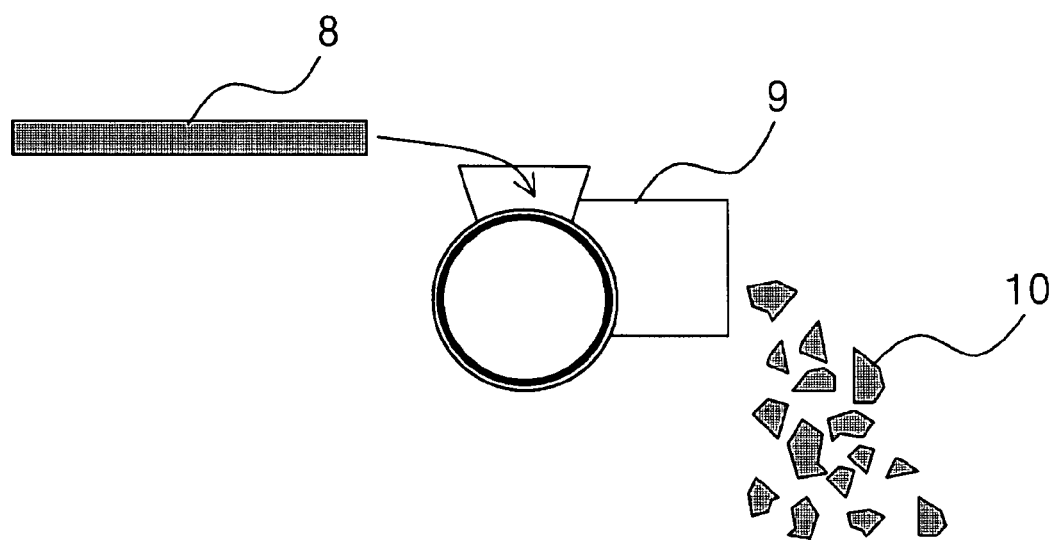
FIG. 6 is a diagrammatic representation showing crushing of a flat plate made of multicolor chips in accordance with the present invention.

FIGS. 5 and 6 show a process for producing multicolor chips 10 used in the present invention. Referring to FIGS. 5 and 6, the multicolor chips 10 are produced by preparing two or more kinds of raw material slurries of the multicolor chips 10, feeding the two or more kinds of slurries into a batch mixer 2 through respective supply lines 1a and 1b, partially mixing and dispersing the two or more kinds of slurries using an impeller 3 in the batch mixer, discharging the dispersed slurry mixture to a discharge port 4a to supply the slurry mixture to a predetermined thickness to a steel belt 6 via a flow plate 5, molding the slurry mixture into a flat plate 7 in the steel belt 6 and curing the flat plate 7 to obtain a cured plate 8, and feeding the cured plate 8 into a crusher 9 to crush it to a predetermined size.

First, two or more kinds of resin pigment compositions (raw material slurries) are prepared so as to create two or more colors.

The resin pigment compositions are prepared by adding pigments to artificial marble raw materials consisting essentially of a base resin syrup, an inorganic filler, a crosslinking agent, and a polymerization initiator. Specifically, each of the resin pigment compositions comprises 100 parts by weight of a base resin syrup, 50~250 parts by weight of an inorganic filler, 0.1~10 parts by weight of a crosslinking agent, 0.1~10 parts by weight of a polymerization initiator, and 0.1~5 parts by weight of a pigment.

As a base resin for the base resin syrup, there can be used an acrylic, unsaturated polyester, epoxy resin, or the like. The base resin syrup is composed of a resin monomer and/or a polymer. The base resin syrup is commonly composed of a mixture of a monomer and a polymer.

The polymerizable monomer for the acrylic resin syrup used in the present invention is preferably an acrylic monomer. Specifically, the acrylic resin syrup is composed of at least one methacrylate monomer selected from methylmethacrylate, ethylmethacrylate, butylmethacrylate, 2-ethylhexylmethacrylate, benzylmethacrylate, and glycidylmethacrylate. A mixture of the methacrylate monomer and a polymer in which only a portion is polymerized can also be used. Of these, methylmethacrylate is particularly preferred. The content of the polymer in the syrup is preferably between 10 wt % and 50 wt %.

There is no restriction as to the kind of unsaturated polyesters that can be used in the present invention, and general unsaturated polyesters can be used without limitation. For example, there can be used unsaturated polyesters having an acid value of 5~40 and a molecular weight of 1,000~5,000 prepared by condensation of saturated and/or unsaturated dibasic acids with polyhydric alcohols.

As α,β-unsaturated dibasic acids and saturated dibasic acids that can be used in the present invention, there may be mentioned maleic anhydride, citraconic acid, fumaric acid, itaconic acid, phthalic acid, phthalic anhydride, isophthalic acid, terephthalic acid), succinic acid, adipic acid, sebacic acid, tetrahydrophthalic acid, and the like.

If necessary, monobasic acids, such as acrylic acid, propionic acid and benzoic acid, and polybasic acids, such as trimellitic acid and benzene tetracarboxylic acid, can be used.

Examples of suitable polyhydric alcohols include ethylene glycol, diethylene glycol, triethylene glycol, propylene glycol, dipropylene glycol, tripropylene glycol, polypropylene glycol, 1,3-butylene glycol, hydrogenated bisphenol A, trimethylol propane monoaryl ether, neopentyl glycol, 2,2,4-trimethyl-1,3-pentanediol, glycerin, and the like.

When the acrylic resin syrup is used as a raw material, the colors of the chips are disadvantageously turbid but the colors are clearly discernable, enabling expression of distinct and splendid designs. On the other hand, when the unsaturated polyester syrup is used as a raw material, transparence characteristic to the unsaturated polyester resin is attained. Thus, an artificial marble using the unsaturated polyester chips is highly three-dimensional over an artificial marble using single-color unsaturated polyester chips.

Examples of inorganic fillers that can be used in the present invention include, but are not limited to, inorganic powders commonly used in the art, e.g., aluminum hydroxide, magnesium hydroxide, calcium aluminate, calcium carbonate, silica powder, and alumina. These inorganic fillers can be used alone or in combination. The inorganic filler preferably has a particle size of from 10 μm to 200 μm and a refractive index of from 1.57 to 1.62. For better dispersibility with the resin, improved mechanical strength of the final product and prevention of precipitation, the surface of the inorganic filler is preferably treated with a silane coupling agent, a titanate coupling agent or stearic acid. The preferred content of the inorganic filler is in the range of 50~250 parts by weight with respect to 100 parts by weight of the base resin syrup.

The crosslinking agent used in the present invention is a polyfunctional acrylic monomer having a copolymerizable double bond in the molecule capable of crosslinking with the acrylic resin syrup, and is selected from ethylene glycol dimethacrylate, diethylene glycol dimethacrylate, triethylene glycol dimethacrylate, tetraethylene glycol dimethacrylate, trimethylol propane trimethacrylate, 1,6-hexanediol dimethacrylate, polybutylene glycol dimethacrylate, neopentyl glycol dimethacrylate, and mixtures thereof. Of these, ethylene glycol dimethacrylate is particularly preferred.

If the crosslinking agent is not used or is used in too small an amount, irregularities are formed on the surface of the artificial marble and air bubbles are generated at the upper and lower portions of the artificial marble, thus weakening the binding force between the raw materials and deteriorating the heat resistance and heat discoloration resistance. On the other hand, if an excess of the crosslinking agent is used, phase separation of the chips takes place, causing many problems in the patterns of the artificial marble. Accordingly, the amount of the crosslinking agent used is preferably limited to 0.2~5 parts by weight, based on 100 parts by weight of the base resin syrup.

The polymerization initiator used in the present invention is an organic peroxide selected from diacyl peroxides, e.g., benzoyl peroxide and dicumyl peroxide, hydroperoxides, e.g., butyl hydroperoxide and cumyl hydroperoxide, t-butyl peroxymaleic acid, t-butyl hydroperoxide, t-butyl hydroperoxybutyrate, acetyl peroxide, lauroyl peroxide, azobisisobutyronitrile, azobisdimethylvaleronitrile, t-butyl peroxyneodecanoate, t-amyl peroxy 2-ethylhexanoate, and mixtures thereof. A mixture of amine peroxide and sulfonic acid or a mixture of a peroxide and a cobalt compound is used so that polymerization and curing can be performed at room temperature. The content of the polymerization initiator is preferably in the range of 0.1~10 parts by weight, based on 100 parts by weight of the base resin syrup. The polymerization initiator is commonly used together with a polymerization accelerator.

A radical carrier selected from mercaptan compounds, such as n-dodecylmercaptan, t-dodecylmercaptan, benzylmercaptan and trimethylbenzylmercaptan, can be further used. The content of the radical carrier is preferably in the range of 0.1~5 parts by weight, based on 100 parts by weight of the base resin syrup.

Examples of color-creating agents that can be used in the present invention include, but are not particularly limited to, organic and inorganic pigments and dyes as additives for artificial marbles commonly known in the art.

In addition to these additives, the compositions may further comprise at least one additive for artificial marbles commonly known in the art selected from: silicon and non-silicon deforming agents; silane coupling agents containing trimethoxysilane as a main component, acid coupling agents, and titanate coupling agents; phenyl salicylate, benzophenone, benzotriazole, nickel derivative, and radical scavenger-type ultraviolet absorbers; halogen, phosphorus and inorganic metal type flame retardants; stearic acid and silicone release agents; catechol and hydroquinone polymerization inhibitors; and phenol, amine, quinone, sulfur and phosphorus antioxidants.

Next, the resin pigment compositions having different colors are supplied to a batch mixer 2 through respective supply lines 1$a$ and 1$b$. The compositions are desirably supplied in amounts ranging from 5 to 100 kg/hr., and preferably have a viscosity of 300~70,000 cps. As shown in FIG. 5, two supply lines 1$a$ and 1$b$ face each other. The arrangement of the supply lines is schematically shown for convenience only. The number, diameter, and intervals of the supply lines can be variously determined without particular limitation.

Next, the two or more kinds of the resin pigment compositions fed into the batch mixer 2 are dispersed using a non-agitation type low-speed impeller 3. The rotation speed of the impeller 3 is preferably restricted to 60 rpm or less because the boundary between colors of the resin pigment compositions is scattered upon high-speed rotation, leading to a bad appearance.

The term "non-agitation" as used herein refers to a slow agitation such that colors of the raw materials remain in every corner of the batch mixer 2 without being completely mixed. The reason for the slow agitation is that complete mixing of the compositions permits the raw materials to have a single color and incomplete mixing leaves colors on only portions of the raw materials.

The liquid resin pigment compositions of different colors are spread or form a boundary by rotation of the non-agitation type low-speed impeller 3 in the batch mixer 2, and then the resulting slurry mixture is discharged through a discharge port 4 disposed at the bottom of the batch mixer 2.

Next, the discharged raw material slurry mixture is supplied to a predetermined thickness to a continuous steel belt 6 via a flow plate 5 installed under the discharge port 4, and molded into a flat plate 7 composed of the resin pigment compositions of various colors.

Molding process is preferably performed by continuous casting molding. The partially mixed liquid resin mixture discharged from a nozzle of the discharge port 4 of the batch mixer 2 is supplied to a conveying steel belt 6, and cured while the belt is moving to obtain a cured plate 8. As another curing process, the slurry mixture can be poured into a mold and cured in a hot-air oven.

Next, the cured plate 8 is fed into a crusher 9 to crush it into multicolor chips 10 having a predetermined size. As the crusher 9, a mill for stone crushing (a hammer mill or cutter mill) is commonly used. It is desirable that the multicolor chips 10 have a size ranging from 0.1 mm to 10 mm, and preferably from 2.0 mm to 6.0 mm. The multicolor chips 10 are variously produced within the above-defined size range. The multicolor chips 10 are sieved through screens of various mesh sizes, and mixed on a size basis to prepare an artificial marble.

Next, after 0.1~50 parts by weight of the multicolor chips 10 composed of the two or more resin pigment compositions are mixed with a raw material slurry for an artificial marble, the resulting mixture is molded to a predetermined thickness in a mold or a steel belt for continuous molding, cured, and polished to prepare the artificial marble of the present invention. At this time, the base slurry may be identical to or different from the main components of the resin pigment raw materials used to produce the multicolor chips 10. For example, an acrylic or unsaturated polyester resin can be used as a resin for the base slurry, like in the production of the multicolor chips 10. Accordingly, the multicolor chips 10 can be produced using an unsaturated polyester resin and the base slurry can be prepared using an acrylic resin.

As a result of visually observing the artificial marble prepared using the multicolor chips, color regions, including a first, a second, a third color regions, etc., are in an amorphous state in the cured multicolor chips of the artificial marble, enabling them to closely resemble natural marbles and granite.

Since the respective color regions of the striped chips are relatively fixed, striped patterns are exhibited.

To form relatively fixed striped patterns, the number of the supply lines 1a and 1b in the batch mixer 2 and the constitution of the batch mixer can be controlled so that a slurry for stripes is sprayed on the base slurry to produce chips having stripes formed at predetermined intervals.

The colors of the striped chips can be varied depending on the intended stripes. In addition, an organic or inorganic pigment or dye may be used to create a desired color. Chips having a size of 30 mesh or less produced using an acrylic resin syrup or an unsaturated polyester resin as a basic raw material can also be used to create a desired color.

Particularly, in the case where the striped chips are produced using an unsaturated polyester resin as a raw material, the use of chips having a size of 30 mesh or less to create the colors of stripes allows the final artificial marble to be highly three-dimensional.

The present invention will now be described in more detail with reference to the following examples. However, these examples are not to be construed as limiting the scope of the invention.

EXAMPLE 1

1. Production of Multicolor Chips

1) Preparation of Raw Materials 100 parts by weight of a methylmethacrylate syrup consisting of 30% by weight of polymethylmethacrylate and 70% by weight of methylmethacrylate, 180 parts by weight of aluminum hydroxide, 0.2 parts by weight of t-butyl peroxyneodecanoate, 0.3 parts by weight of t-amyl peroxy 2-ethylhexanoate, 3 parts by weight of ethylene glycol dimethacrylate, 0.2 parts by weight of n-dodecylmercaptan, 0.2 parts by weight of BYK 555 (BYK-Chemie, Germany) as a defoaming agent, 0.75 parts by weight of BYK 900 (BYK-Chemie, Germany) as a coupling agent, and 0.2 parts by weight of Hisorp-P (LG Chem., Korea) as an ultraviolet stabilizer (absorber) were mixed to prepare raw material slurries. Each of the raw material slurries was mixed with 0.3 parts by weight of a pigment to prepare two or more kinds of resin pigment compositions having different colors.

2) Production of Multicolor Chips

The two or more kinds of resin pigment compositions (viscosity: 7,000 cps) prepared in 1) were supplied in an amount of 50 kg/hr to a batch mixer 2 through respective supply lines 1a and 1b, and dispersed by mixing using an impeller 3 at a low speed of 30 rpm to spread the two or more liquid resin pigment compositions of different colors and form a boundary therebetween. The resulting slurry mixture was discharged through a discharge port 4 disposed at the bottom of the batch mixer 2. The discharged raw material slurry mixture was supplied to a continuous steel belt 6 via a flow plate 5 installed under the discharge port, molded in the steel belt into a flat plate 7 (thickness: 14 mm) for multicolor chips 10 composed of the resin pigment compositions of various colors, and cured to obtain a cured plate 8. The cured plate 8 was fed into a crusher 9, and crushed into multicolor chips 10 having a particle size of 0.1~10 mm.

2. Preparation of Artificial Marble

Twenty parts by weight of the multicolor chips, 100 parts by weight of a methylmethacrylate syrup consisting of 28% by weight of polymethylmethacrylate and 72% by weight of methylmethacrylate, 160 parts by weight of aluminum hydroxide, 0.2 parts by weight of t-butyl peroxyneodecanoate, 0.3 parts by weight of t-amyl peroxy 2-ethylhexanoate, 3 parts by weight of ethylene glycol dimethacrylate, 0.2 parts by weight of n-dodecylmercaptan, 0.2 parts by weight of BYK 555 (BYK-Chemie, Germany) as a defoaming agent, 0.75 parts by weight of BYK 900 (BYK-Chemie, Germany) as a coupling agent, and 0.2 parts by weight of Hisorp-P (LG Chem., Korea) as an ultraviolet stabilizer (absorber) were mixed to prepare an artificial marble slurry. Thereafter, the slurry was molded in a steel belt 6 for continuous molding, and cured to produce a plate having a thickness of 14 mm. The top and bottom surfaces of the plate were polished to thicknesses of 1 mm and 2 mm, respectively, to prepare an artificial marble having a natural stone-like texture.

EXAMPLE 2

1. Production of Striped Chips

1) Preparation of Raw Materials 100 parts by weight of a methylmethacrylate syrup consisting of 30% by weight of polymethylmethacrylate and 70% by weight of methylmethacrylate, 180 parts by weight of aluminum hydroxide, 0.2 parts by weight of t-butyl peroxyneodecanoate, 0.3 parts by weight of t-amyl peroxy 2-ethylhexanoate, 3 parts by weight of ethylene glycol dimethacrylate, 0.2 parts by weight of n-dodecylmercaptan, 0.2 parts by weight of BYK 555 (BYK-Chemie, Germany) as a defoaming agent, 0.75 parts by weight of BYK 900 (BYK-Chemie, Germany) as a coupling agent, and 0.2 parts by weight of Hisorp-P (LG Chem., Korea) as an ultraviolet stabilizer (absorber) were mixed to prepare a slurry as a base raw material of a flat plate. Separately, slurries for stripes of two colors having the same composition as the base slurry were prepared, except that 0.3 parts by weight of pigments were further added to create colors.

2) Production of Chips

The base slurry for background and the slurries for stripes of two colors were supplied in an amount of 50 kg/hr to a batch mixer 2 through respective supply lines 1a and 1b spaced at fixed intervals, and dispersed by mixing using an impeller 3 at a low speed of 30 rpm to form the striped pattern shown in FIG. 2. The resulting slurry mixture was discharged through a discharge port 4 disposed at the bottom of the batch mixer 2. The discharged raw material slurry mixture was supplied to a continuous steel belt 6 via a flow plate 5 installed under the discharge port, molded in the steel belt into a flat plate 7 (thickness: 14 mm) for striped chips 10, and cured to obtain a cured plate 8. The cured plate 8 was fed into a crusher 9, and crushed into the multicolor chips 10 (particle size of 0.1~10 mm) shown in FIG. 2.

On the other hand, only an organic or inorganic pigment was added to the base slurry, cured, and crushed into general single-color chips.

2. Preparation of Artificial Marble

Twenty-five parts by weight of the single-color chips, 15 parts by weight of the striped chips, 100 parts by weight of a methylmethacrylate syrup consisting of 28% by weight of polymethylmethacrylate and 72% by weight of methylmethacrylate, 160 parts by weight of aluminum hydroxide, 0.2 parts by weight of t-butyl peroxyneodecanoate, 0.3 parts by weight of t-amyl peroxy 2-ethylhexanoate, 3 parts by weight of ethylene glycol dimethacrylate, 0.2 parts by weight of n-dodecylmercaptan, 0.2 parts by weight of BYK 555 (BYK-Chemie, Germany) as a defoaming agent, 0.75 parts by weight of BYK 900 (BYK-Chemie, Germany) as a coupling agent, and 0.2 parts by weight of Hisorp-P (LG Chem., Korea) as an ultraviolet stabilizer (absorber) were mixed to prepare an artificial marble slurry. Thereafter, the slurry was molded in a steel belt 6 for continuous molding, and cured to produce a plate having a thickness of 14 mm. The top and bottom surfaces of the plate were polished to thicknesses of 1 mm and 2 mm, respectively, to prepare an artificial marble having a natural stone-like texture.

EXAMPLE 3

An artificial marble was prepared in the same manner as in Example 2, except that 30 parts by weight of the striped chips and 10 parts by weight of the single-color chips were used.

INDUSTRIAL APPLICABILITY

Since conventional artificial marbles of various colors are composed of combinations of single-color chips, they have a monotonous appearance when compared to natural stone, and particularly, have limitations in expressing colors and designs inherent to natural stone.

In general, acrylic artificial marbles have good workability, light weight, excellent weather resistance, and superior thermal properties. Based on these advantages, acrylic artificial marbles are currently used in various applications, such as countertops and various interior decorative materials. However, acrylic artificial marbles have disadvantages that they cannot express various designs and colors of natural marbles. Particularly, the design of colors that can be continuously obtained by combinations of single-color chips exhibits a monotonous feeling. In addition, acrylic artificial marbles has limitations in achieving colors and designs of a natural stone-like texture.

In view of the above-mentioned problems, an artificial marble was prepared using multicolor chips of two or more colors in the present invention. The artificial marble of the present invention has an appearance clearly distinguished from conventional artificial marbles and a natural stone-like texture.

Particularly, striped chips for an artificial marble into which at least one design was inserted were produced using an artificial marble base slurry and resin pigment compositions having different colors in the present invention. The striped chips are composed of two or more resin pigment compositions, unlike conventional single-color chips for artificial marbles. The artificial marble using the striped chips according to the present invention has the design closely resembling natural stone, unlike conventional artificial marbles.

The invention claimed is:

1. An artificial marble comprising multicolor chips, wherein two or more color regions are present in each chip and a boundary region is formed between adjacent color regions; and wherein the color difference ($\Delta E$) is 0.01 or higher, as measured using a CIE (Commission Internationale de l'Eclairage or International Commission on Illumination) color system, between adjacent color regions, and the boundary region includes at least two pigment compositions of the adjacent color regions.

2. The artificial marble according to claim 1, wherein the multicolor chips have a striped pattern.

3. The artificial marble according to claim 2, wherein the striped chips include one or more stripe regions extended continuously or discontinuously along the circumference of the chips.

4. The artificial marble according to claim 3, wherein the stripe regions are in the form of a straight or curved line.

5. The artificial marble according to claim 3, wherein the striped chips include one background region and one or more stripe regions.

6. The artificial marble according to claim 5, wherein one of the stripe regions is wholly or partly adjacent to another stripe region along the circumference of the chips.

7. The artificial marble according to claim 5, wherein one of the stripe regions is wholly spaced apart from another stripe region along the circumference of the chips.

8. The artificial marble according to claim 3, wherein the striped chips consist of two or more stripe regions.

9. The artificial marble according to claim 3, wherein the stripe regions have a width of between 0.1 mm and 10 mm.

10. The artificial marble according to claim 1, wherein the multicolor chips have a size of between 0.1 mm and 10 mm.

11. The artificial marble according to claim 1, wherein the colors of the multicolor chips are created using an organic or inorganic pigment, or a dye.

12. The artificial marble according to claim 1, further comprising single-color chips.

* * * * *